US007474706B2

(12) United States Patent
Wang et al.

(10) Patent No.: US 7,474,706 B2
(45) Date of Patent: Jan. 6, 2009

(54) METHOD OF TRANSMITTING DATA

(75) Inventors: Ching-Tung Wang, Hsinchu Hsien (TW); Fu-Zhi Chang, Changhua (TW); Jui-Lung Hung, Taoyuan (TW)

(73) Assignee: TPO Displays Corp., Chu-Nan (TW)

( * ) Notice: Subject to any disclaimer, the term of this patent is extended or adjusted under 35 U.S.C. 154(b) by 637 days.

(21) Appl. No.: 10/964,978

(22) Filed: Oct. 13, 2004

(65) Prior Publication Data

US 2005/0111571 A1 May 26, 2005

(30) Foreign Application Priority Data

Oct. 14, 2003 (TW) ............................ 92128383 A

(51) Int. Cl.
*H04L 27/00* (2006.01)
*G09G 3/32* (2006.01)

(52) U.S. Cl. ........................... 375/295; 345/98; 345/87

(58) Field of Classification Search ................ 375/295, 375/376, 346, 354, 371; 345/99, 204, 534, 345/563, 98, 87; 711/167, 105, 154
See application file for complete search history.

(56) References Cited

U.S. PATENT DOCUMENTS

| | | | | |
|---|---|---|---|---|
| 6,335,718 | B1 * | 1/2002 | Hong et al. | 345/98 |
| 6,356,260 | B1 * | 3/2002 | Montalbo | 345/204 |
| 6,977,647 | B2 * | 12/2005 | Park | 345/204 |
| 7,032,092 | B2 * | 4/2006 | Lai | 711/167 |
| 7,209,103 | B2 * | 4/2007 | Maeda et al. | 345/87 |

OTHER PUBLICATIONS

J.L.Knighten, J.T.DiBene II, L.O.Hoeft, EMI Common-Mode Current Dependence on Delay Skew Imbalance in High Speed Differential Transmission Lines Operating at 1 Gigabit/Second Data Rates, Mar. 20-22, 2000 ,Quality Electronic Design, 2000. ISQED 2000. Proceedings. IEEE 2000 First International Symposium.*

* cited by examiner

*Primary Examiner*—David C. Payne
*Assistant Examiner*—Tanmay k Shah
(74) *Attorney, Agent, or Firm*—Liu & Liu

(57) ABSTRACT

A method of data transmission is provided. The method uses a differential data reverse signal to implement the differential data signal so that the number of the signal transitions can be effectively reduced in order to keep up with the data transmission rate. Further, because of using the differential data signals and the differential data reverse signal, the power consumption and the EMI can also be reduced.

11 Claims, 4 Drawing Sheets

METHOD OF TRANSMITTING DATA

CROSS-REFERENCE TO RELATED APPLICATION

This application claims the priority benefit of Taiwan application serial. no. 92128383, filed on Oct. 14, 2003.

BACKGROUND OF THE INVENTION

1. Field of the Invention

This invention generally relates to a method of transmitting data, and more particularly to a method of transmitting data which reduces electro-magnetic interference and power consumption.

2. Description of Related Art

Data transmission is generally performed by a transmitter and a receiver. When transmitting data, the transmitter sends the data to the receiver. For example, in a liquid crystal display (LCD), a transmitter and receiver pair may include the panel controller (i.e., the transmitter) and source driver (i.e., the receiver). The panel controller will send the data to the source driver and the source driver will receive the data from the panel controller.

FIG. 1 is a schematic view of a conventional data transmission scheme. Referring to FIG. 1, the transmitter 102 sends a plurality of data signals (Data Signal 1, Data Signal 2, . . . Data Signal N) to the receiver 104 and the receiver 104 will receive the data signals (Data Signal 1, Data Signal 2, . . . Data Signal N). Currently, most data signals are transistor-transistor logic (TTL) signals; the high level voltage of the TTL signals is about 3.5V; the low level voltage of the TTL signals is about0V. Hence, when transmitting the data signals (Data Signal 1, Data Signal 2, . . . Data Signal N), the data signals will suffer serious electro-magnetic interference (EMI) and require more power consumption, since EMI and power consumption are proportional to the voltage level of the data signals.

FIG. 2 is a schematic view of another conventional data transmission scheme. Compared to FIG. 1, the data transmission in FIG. 2 transmits differential data signals (Data Signal 1±, Data Signal 2±, . . . Data Signal N±) rather than the data signals (Data Signal 1, Data Signal 2, . . . Data Signal N) to reduce the EMI and power consumption. Because the voltage level of the differential data signals is lower than that of the data signals, the data transmission in FIG. 2 can reduce the EMI and power consumption.

Although the use of the differential data signals can reduce the EMI and power consumption, however when the transmission rate gets higher and a significant amount of differential data signals are in transition, the EMI and power consumption are still unacceptable. Therefore, when the transmission rate is getting higher, how to reduce the EMI and power consumption becomes an important issue.

SUMMARY OF THE INVENTION

The present invention is to provide a method of transmitting data which utilizes a differential data reverse signal to potentially reduce the number of signal level transitions in the data transmission, so that the EMI and power consumption can be reduced and the differential data signals can keep up with the data transmission rate.

In one embodiment, the present invention provides a method of transmitting data comprising: transmitting a plurality of differential data signals and a differential data reverse signal; and receiving the plurality of differential data signals and decoding the plurality of differential data signals based on the differential data reverse signal to transform the plurality of differential data signals into a plurality of decoded differential data signals; wherein when the differential data reverse signal is at a first logic level, the plurality of decoded differential data signals are the plurality of differential data signals, when the differential data reverse signal is at a second logic level, the plurality of decoded differential data signals are the plurality of differential data signals with an opposite phase.

In an embodiment, the first logic level is a low logic level, and the second logic level is a high logic level.

In another embodiment, when the number of signal level transitions between the plurality of decoded differential data signals and the plurality of differential data signals is larger than a predetermined fraction (e.g., one-half) of the number of the total differential data signals, the differential data reverse signal is enabled, wherein when the differential data reverse signal changes from the first logic level to the second logic level, the plurality of decoded differential data signals are the plurality of differential data signals with an opposite phase.

In an embodiment, the step of transmitting the plurality of differential data signals and the differential data reverse signal is performed by a transmitter.

In an embodiment, the step of receiving the plurality of differential data signals and decoding the plurality of differential data signals is performed by a receiver.

Therefore, differential signals can use lower voltage swings than are used with single-ended signals. This is possible because the differential threshold in a differential receiver is better controlled than the threshold of a single transistor. The lower swing leads to faster circuits and can reduce power consumption. Differential signaling also reduces EMI, since the opposite currents carried on the two traces leads to cancellation of the electric and magnetic fields at large distances. Similarly, differential signals are less sensitive to crosstalk. Some differential circuits use a complimentary single-ended signal, with the second half of the differential signal being taken from a voltage reference. This has the advantage of using a single trace for routing. So, the present invention can reduce the transition of the data signals by using the differential data reverse signal so that the EMI and power consumption can be reduced and the differential data signals can keep up with the data transmission rate.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 1:
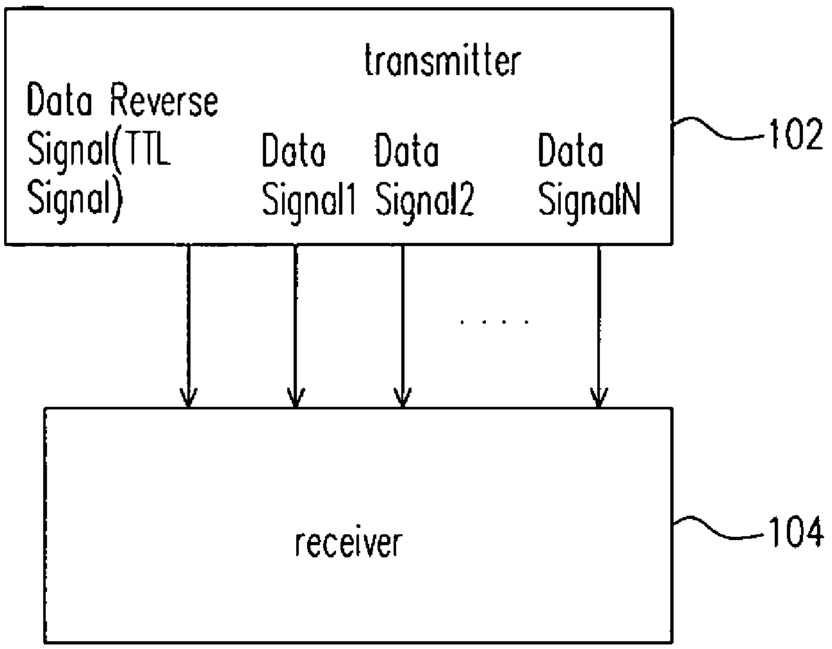
FIG. 1 (PRIOR ART)
FIG. 1 is a schematic view of a conventional data transmission scheme.
Figure 2:
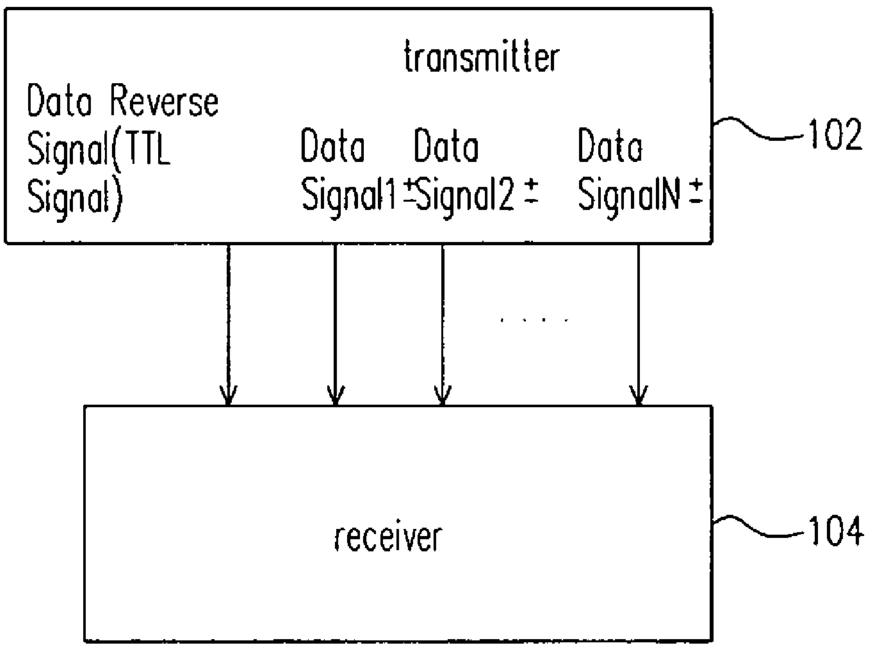
FIG. 2 (PRIOR ART)
FIG. 2 is a schematic view of another conventional data transmission scheme.

To overcome the drawback in the conventional data transmission of FIG. 2, a differential data reverse signal is sent with the differential data signals. The differential data reverse signal functions to reverse the phase of the differential data signals when the number of transitions between the plurality of decoded differential data signals and the plurality of differential data signals is larger than a predetermined fraction (e.g., one-half) of the number of the total differential data signals. That is, the differential data signals at the high logic level will be reversed to the low logic level, and vice versa. Hence, the differential data reverse signal can effectively reduce the number of signal level transitions, EMI, and power consumption.

Figure 3:
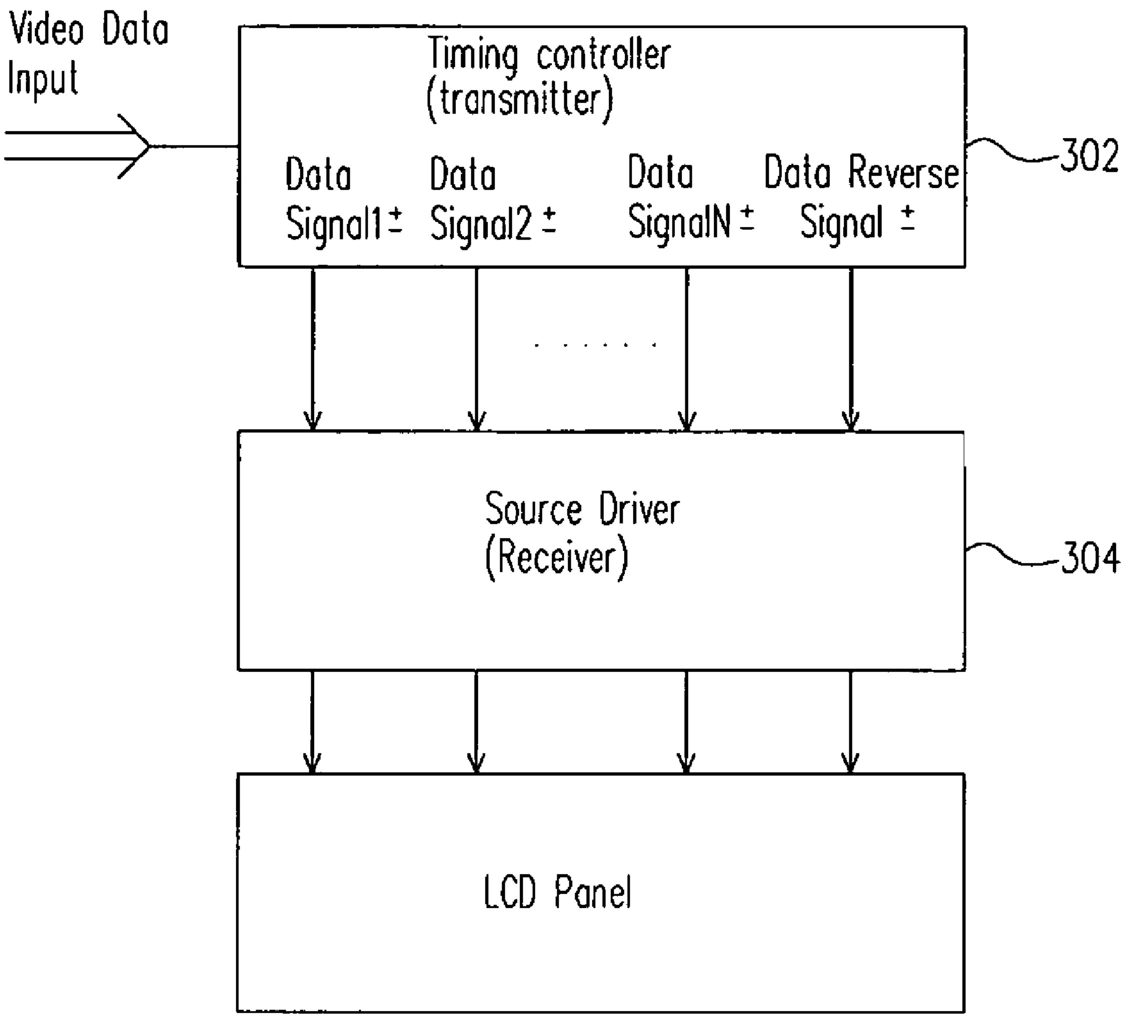
FIG. 3 is a schematic view of data transmission scheme in accordance with one embodiment of the present invention.
Figure 4:
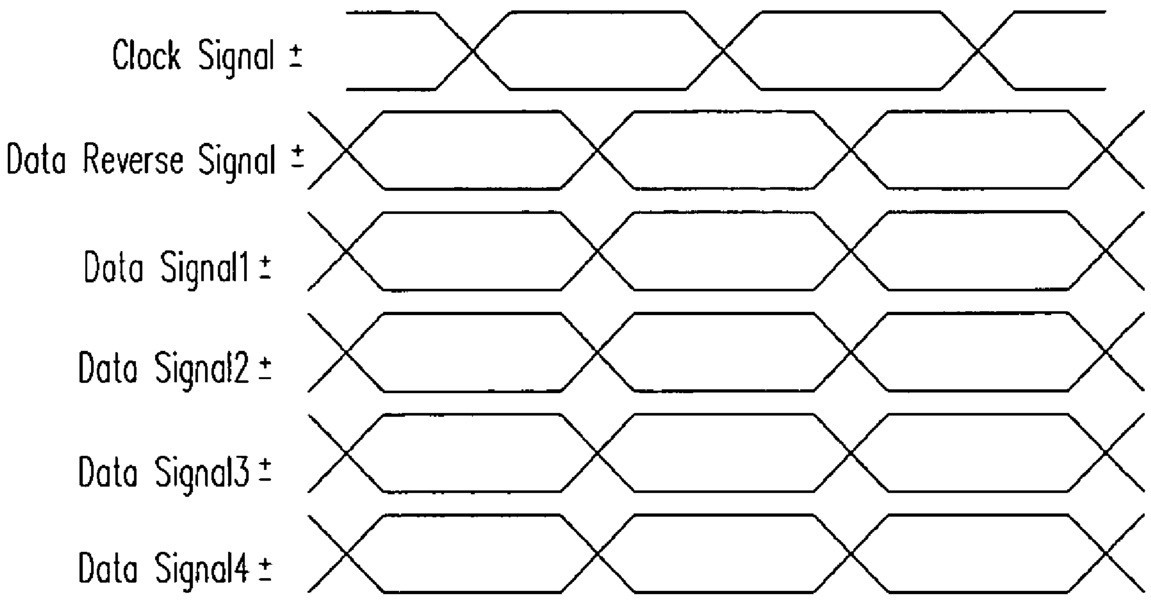
FIG. 4 shows the waveforms of the differential data signals, the differential data reverse signal, and clock signals of FIG. 3.

FIG. 3 is a schematic view of data transmission in accordance with an embodiment of the present invention. As shown in FIG. 3, the transmitter 302 sends a plurality of differential data signals (Data Signal 1±, Data Signal 2±, . . . , Data Signal N±) and a differential data reverse signal (Differential Data Reverse Signal±) to the receiver 304, and the receiver 304 will receive the differential data signals (Data Signal 1±, Data Signal 2±, . . . , Data Signal N±) and receives the differential data reverse signal (Differential Data Reverse Signal±) and decodes the differential data signals into a plurality of decoded differential data signals(Decoded Data Signal 1±, Decoded Data Signal 2 ±, . . . , Decoded Data Signal N±) based on the differential data reverse signal (differential data reverse signal±). FIG. 4 shows the waveforms of the differential data signals, the differential data reverse signal, and clock signals of FIG. 3.

Figure 5:
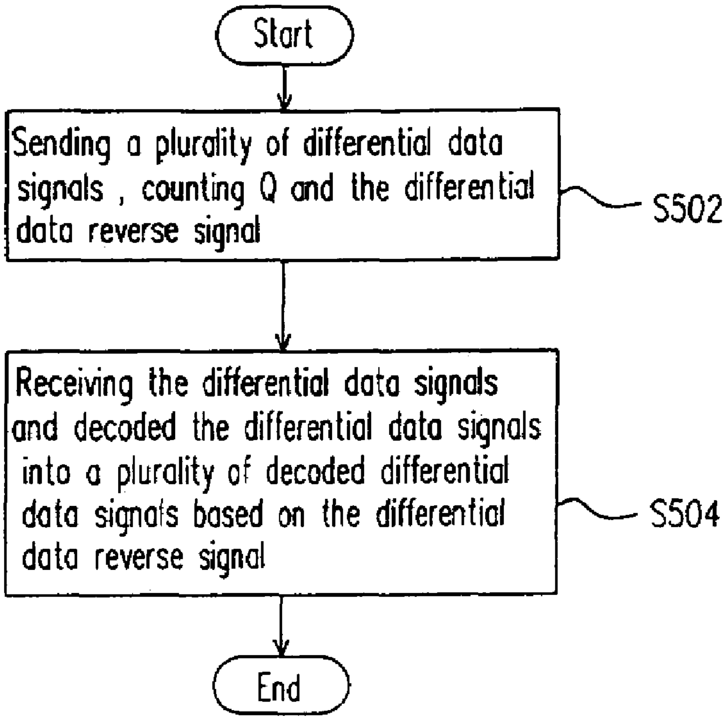
FIG. 5 is the flow chart of the data transmission process in accordance with one embodiment of the present invention.

FIG. 5 is the flow chart of the data transmission in accordance with a preferred embodiment of the present invention. First, the transmitter 302 sends a plurality of differential data signals (Data Signal 1±, Data Signal 2±, . . . , Data Signal N±) and the differential data reverse signal to the receiver 304 and the receiver 304 will receive the differential data signals (Data Signal 1±, Data Signal 2±, . . . , Data Signal N±) and decodes the differential data signals into a plurality of decoded differential data signals(Decoded Data Signal 1±, Decoded Data Signal 2±, . . . , Decoded Data Signal N±) based on the differential data reverse signal (differential data reverse signal±) (as shown in S502). In this embodiment, when the differential data reverse signal (differential data reverse signal ±) is at low logic level (i.e., disabled), the decoded differential data signals(Decoded Data Signal 1±, Decoded Data Signal 2±, . . . , Decoded Data Signal N±) are the differential data signals (Data Signal 1±, Data Signal 2±, Data Signal N±). When the differential data reverse signal (differential data reverse signal ±) is at high logic level (i.e., enabled), the decoded differential data signals (Decoded Data Signal 1±, Decoded Data Signal 2±, . . ., Decoded Data Signal N±) are the differential data signals (Data Signal 1±, Data Signal 2±, . . . , Data Signal N±) with an opposite phase (as shown in S504).

Figure 6:
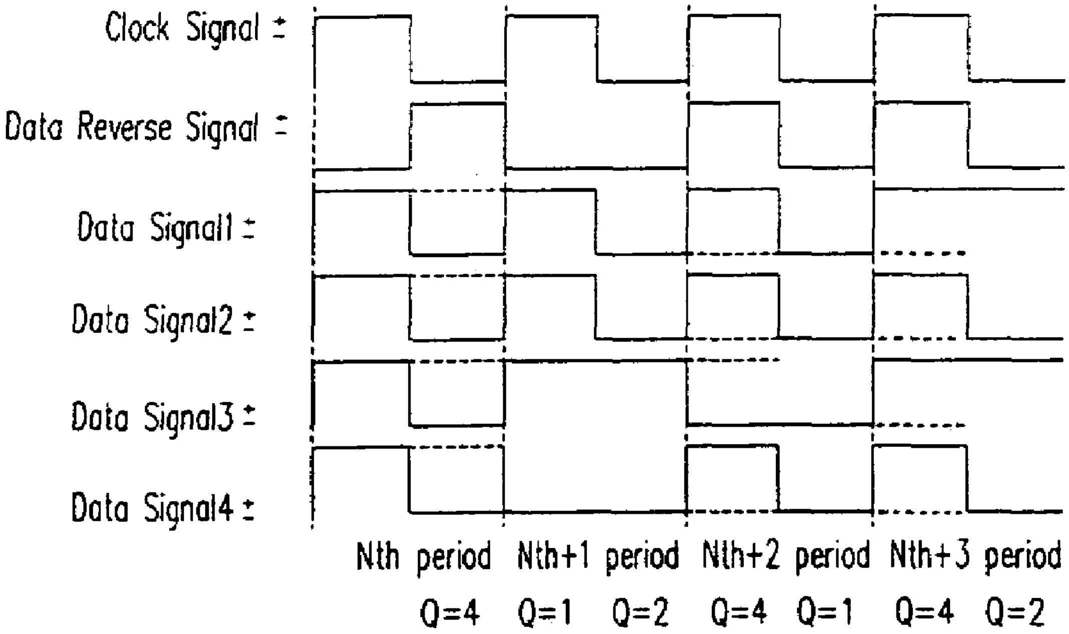
FIG. 6 shows an example of waveforms of the differential data signals, the differential data reverse signal, and clock signals in accordance with one embodiment of the present invention.

FIG. 6 shows an example of waveforms of the differential data signals, the differential data reverse signal, and clock signals in accordance with a preferred embodiment of the present invention. In FIG. 6, two bits will be transmitted in each clock signal period. The waveforms in FIG. 6 can be applied to the reduced swing differential signal (RSDS) interface. Here we assume that the number of the differential data signals is 4; i.e., there are 4 channels. Taking the Nth period as an example, the second bits of the transmitting differential data signals (Data Signal 1±, Data Signal 2±, Data Signal 3±, Data Signal 4±) are at low logic level. The previous decoded differential data signals are at high level (because the differential data reverse signal is disabled, the previous decoded differential data signals are the first bits of the differential data signals). Hence, the number of signal level transitions Q is 4. When the number of signal level transitions is larger than a predetermined fraction of the number of the differential data signals, the differential data reverse signal is enabled. In a preferred embodiment, when the number of signal level transitions is larger than half the number of the differential data signals, the differential data reverse signal is enabled. Here, because the number of signal level transitions Q is 4, which is larger than $4*\frac{1}{2}=2$. Therefore, the differential data reverse signal is enabled (i.e., at high logic level) and will reverse the phase of the transmitting differential data signals as the decoded differential data signals. Here, it reverses the transmitting differential data signals at the low logic level to the high logic level (shown as dot lines in FIG. 6).

Considering the first bits of the $N+1^{st}$ period and the second bits of the Nth period, in the transmitting differential data signals (the first bits of the $N+1^{st}$ period) the Data Signal 1±, Data Signal 2±, and Data Signal 3± are at high logic level, and Data Signal 4± is at low logic level. The previous decoded differential data signals (the second bits of the Nth period) are at high level. Hence, the number of signal level transitions Q is 1, which is smaller than $4*\frac{1}{2}=2$. Therefore, the differential data reverse signal is disabled (i.e., low logic level) and the transmitting differential data signals are the decoded differential data signals.

In brief, the present invention uses a differential data reverse signal to disable the signal level reverse of the data signal so that the number of the signal level transitions can be effectively reduced in order to keep up with the data transmission rate. Further, because of using the differential data signals and the differential data reverse signal, the power consumption and the EMI can also be reduced.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A method of transmitting data signals, comprising:

transmitting a plurality of differential data signals and a differential data reverse signal; and receiving said plurality of differential data signals and differential data reverse signal; and decoding said plurality of differential data signals based on said differential data reverse signal to transform said plurality of differential data signals to a plurality of decoded differential data signals;

wherein when said differential data reverse signal is at a first logic level, said plurality of decoded differential data signals are said plurality of differential data signals, when said different data reverse signal is at a second logic level, said plurality of decoded differential data signals are said plurality of differential data signals with an opposite phase, and wherein when the number of signal level transitions between said plurality of decoded differential data signals and said plurality of differential data signals is larger than a predetermined fraction of the number of said differential data signals, said differential data reverse signal is enabled.

2. The method of claim 1, wherein when said differential data reverse signal changes from said first logic level to said second logic level, said plurality of decoded differential data signals are said plurality of differential data signals with an opposite phase.

3. The method of claim 1, wherein when the number of signal level transitions between said plurality of decoded differential data signals and said plurality of diffrrential data signals is larger than half of number of said differential data signals, said differential data reverse signal is enabled.

4. The method of claim 3, wherein when said differential data reverse signal changes from said first logic level to said second logic level, said plurality of decoded differential data signals are said plurality of differential data signals with an opposite phase.

5. The method of claim 1, wherein said step of transmitting said plurality of differential data signals and said different data reverse signal is performed by a transmitter.

6. The method of claim 1, wherein said step of receiving said plurality of differential data signals and decoding said plurality of differential data signals is performed by a receiver.

7. A transmission system for data signals, comprising:

a transmitter transmitting a plurality of differential data signals and a differential data reverse signal;

a receiver receiving said plurality of differential data signals and differential data reverse signal; and a decoder decoding said plurality of differential data signals based on said differential data reverse signal to transform said plurality of differential data signals to a plurality of decoded differential data signals;

wherein when said differential data reverse signal is at a first logic level, said plurality of decoded differential data signals are said plurality of differential data signals, when said different data reverse signal is at a second logic level, said plurality of decoded differential data signals are said plurality of differential data signals with an opposite phase, and wherein when the number of signal level transitions between said plurality of decoded differential data signals and said plurality of differential data signals is larger than a predetermined fraction of the number of said differential data signals. said differential data reverse signal is enabled.

8. The transmission system of claim 7, wherein said first logic level is a low logic level, and said second logic level is a high logic level.

9. The transmission system of claim 7, wherein when said differential data reverse signal changes from said first logic level to said second logic level, said plurality of decoded differential data signals are said plurality of differential data signals with an opposite phase.

10. The transmission system of claim 7, wherein when the number of signal level transitions between said plurality of decoded differential data signals and said plurality of differential data signals is larger than half of number of said differential data signals, said differential data. reverse signal is enabled.

11. The transmission system of claim 10, wherein when said differential data reverse signal changes from said first logic level to said second logic level, said plurality of decoded differential data signals are said plurality of differential data signals with an opposite phase.

* * * * *